Oct. 8, 1940.　　　D. H. BIERMAN　　　2,217,609
GAUGE
Filed June 23, 1938　　　3 Sheets-Sheet 1
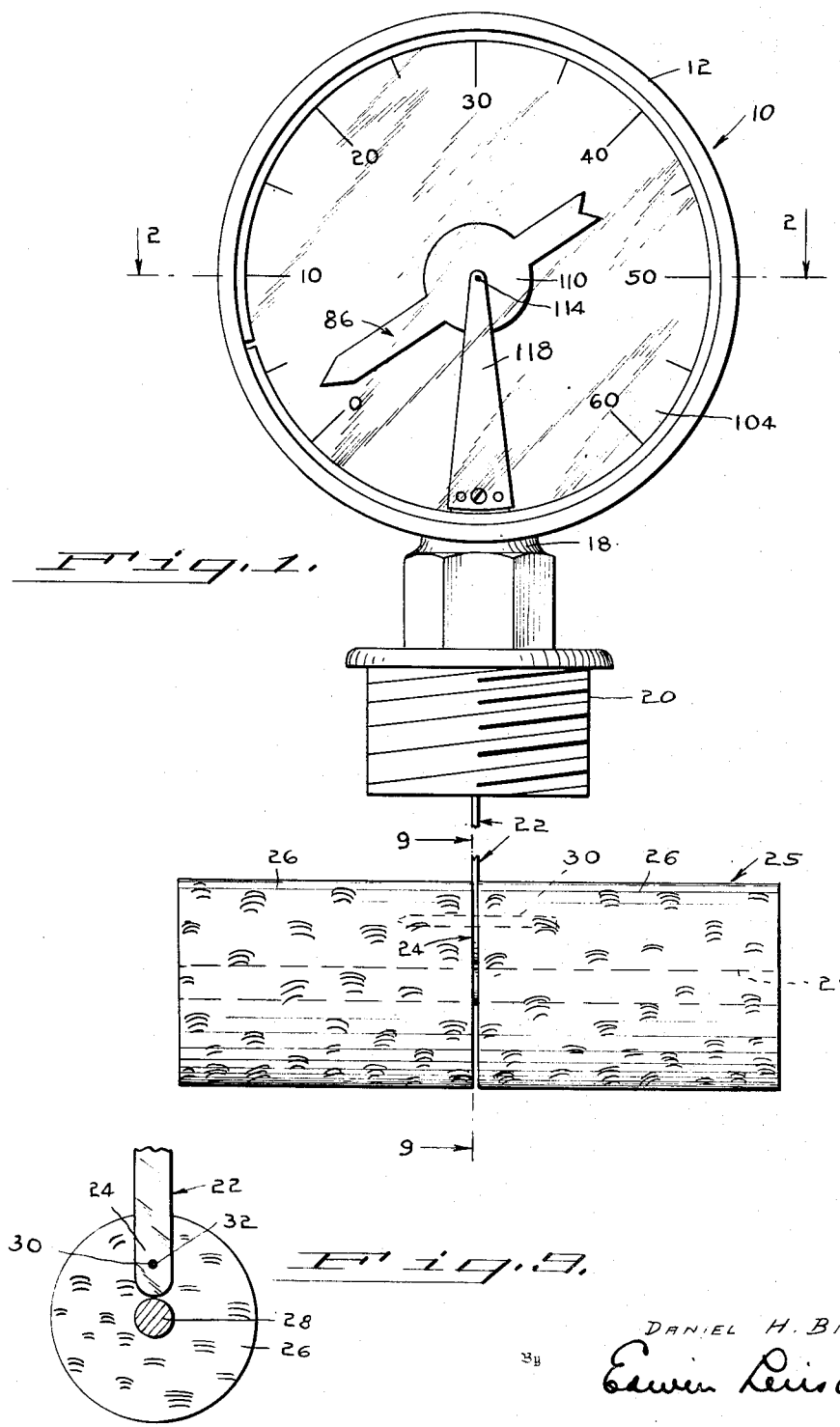

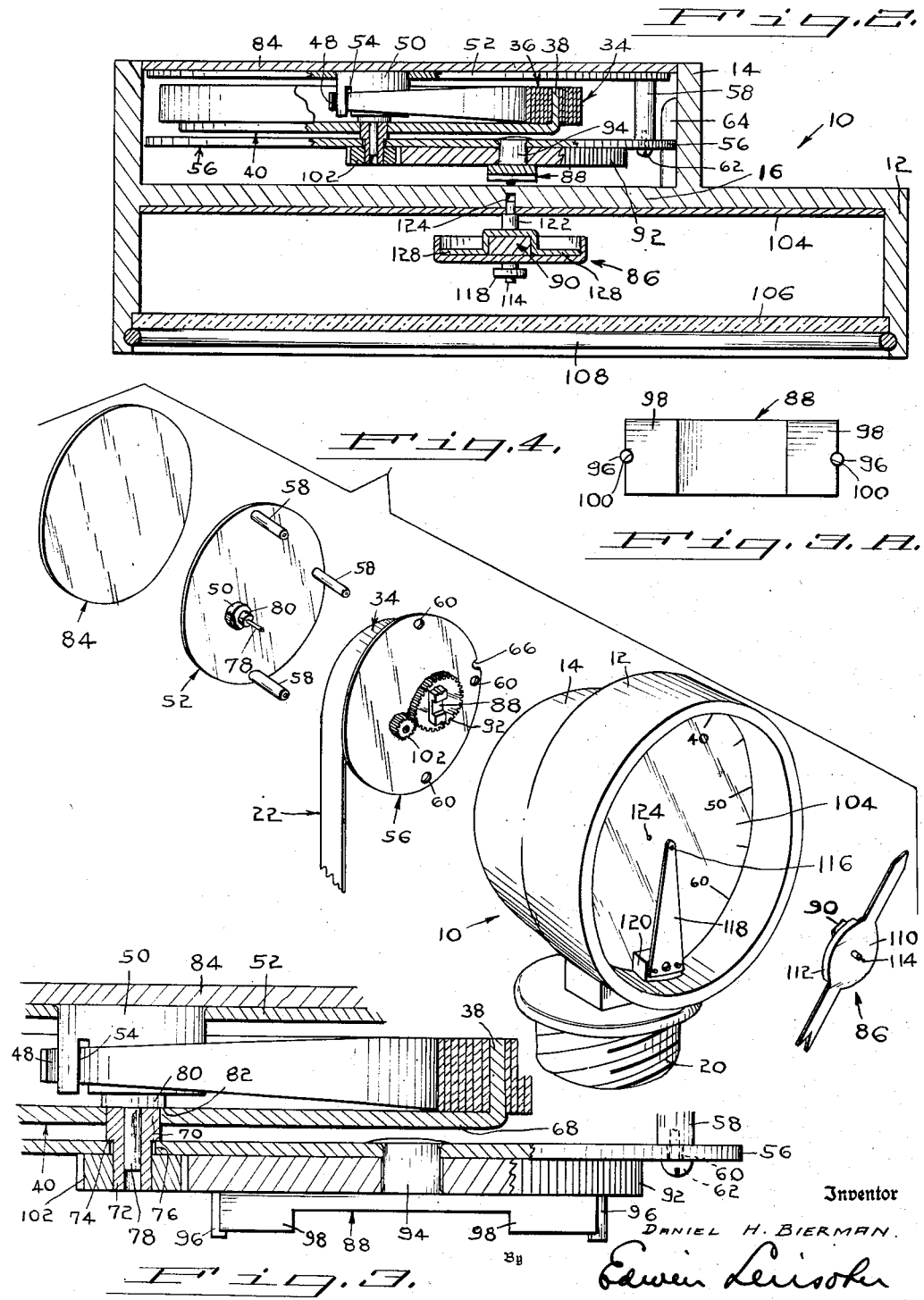

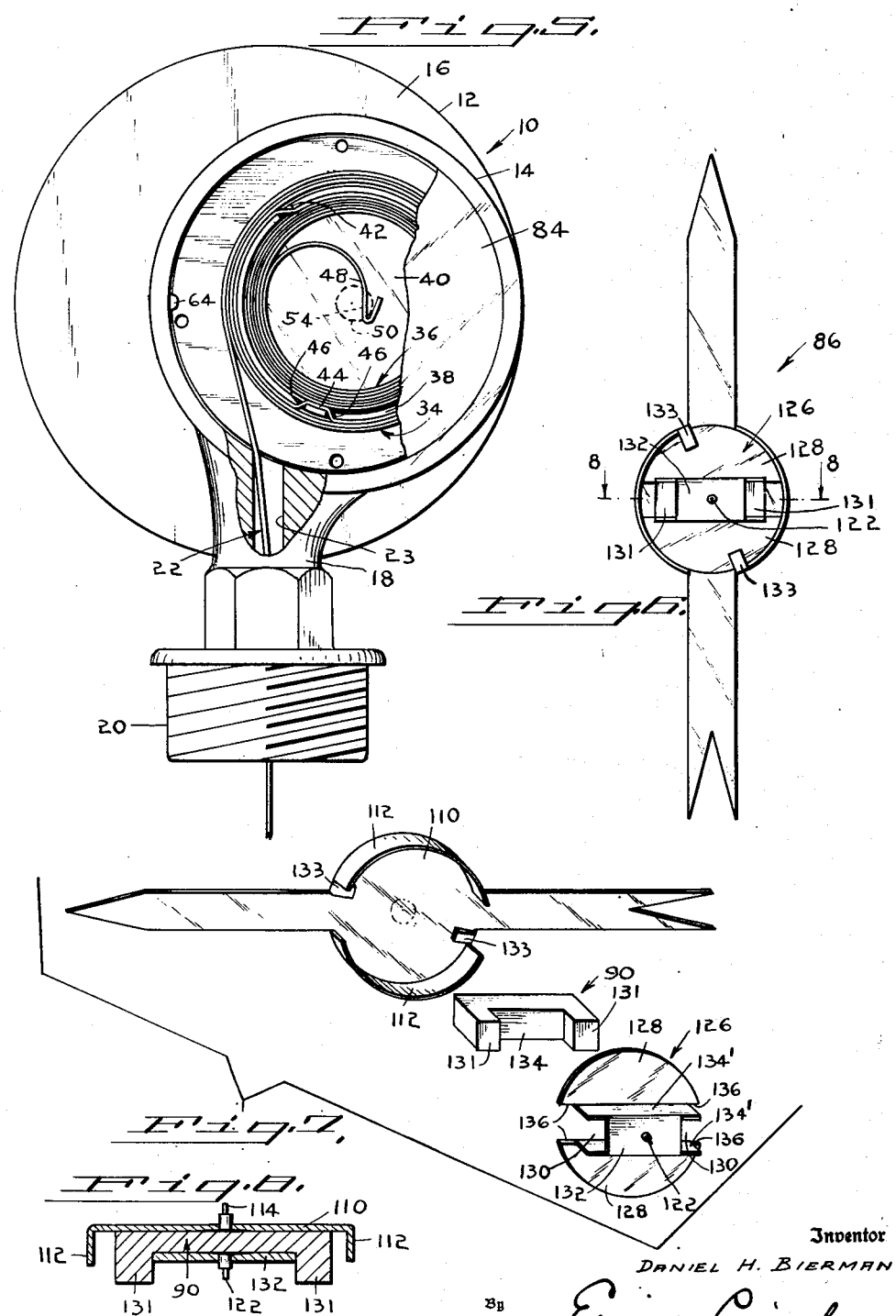

Patented Oct. 8, 1940

2,217,609

UNITED STATES PATENT OFFICE 2,217,609

GAUGE

Daniel H. Bierman, Malverne, N. Y., assignor to Petrometer Corporation, Long Island City, N. Y., a corporation of New York Application June 23, 1938, Serial No. 215,335

12 Claims. (Cl. 116—129)

This invention relates to measuring instruments, and more particularly, to gauges, more specifically, gauges for indicating the quantity of liquid in a tank or other container.

One object of the invention is to provide an improved gauge of the float-control type which comprises flexible means, such as a metal tape arranged in the form of a coil which is automatically wound and unwound, as the level of the liquid rises and falls, for actuating the pointer of the gauge to indicate the quantity of liquid in the container with which the gauge is associated. More specifically, the object of the invention in this connection is to improve the construction of the parts of the gauge involving the flexible tape whereby to simplify such parts for the purpose of facilitating the assembly thereof, for improving the operation of the gauge, and in general for the purpose of providing a gauge of the character described which is practical in construction, reliable in operation, and for producing a gauge which is accurate and operates with accuracy indefinitely over a long period of time.

Another object of the invention is the provision of a gauge in which the pointer or indicator is actuated magnetically, and more specifically, to provide improved magnetic means for actuating the indicator.

A further object of the invention is to provide the gauge with a magnetically actuated indicator comprising a pointer and a magnet constructed and arranged to facilitate the assembly of the magnet with the pointer.

A yet further object of the invention is generally to improve the construction and operation of liquid level gauges.

The above objects of the invention and other objects which might hereinafter appear will be fully understood from the following description considered with reference to the accompanying drawings.

In the drawings:

Fig. 1 is a front view of a gauge embodying the present invention;

Fig. 2 is a sectional view on the line 2—2 of Fig. 1;

Fig. 3 is a sectional view showing on a larger scale parts illustrated in Fig. 2;

Fig. 3a is a face view of a magnet utilized in accordance with the present invention;

Fig. 4 is a perspective view of parts of the gauge in separated relation;

Fig. 5 is a rear view of the gauge, partly in section, and with parts omitted for the purpose of illustration;

Fig. 6 is a rear view of the indicator pointer and magnet assembly;

Fig. 7 is a perspective view of the parts of the indicator pointer and magnet assembly in separated relation;

Fig. 8 is a sectional view on the line 8—8 of Fig. 6;

Fig. 9 is a detail sectional view on the line 9—9 of Fig. 1.

Referring now to the drawings in detail, the gauge constructed in accordance with the preferred embodiment of the present invention, comprises a casing 10, preferably formed as a one-piece casting, and having front and rear cylindrical portions 12 and 14, respectively, separated by a dividing wall 16. Rear casing portion 14 has a substantially smaller diameter than front portion 12 and, for a purpose to be hereinafter described, is disposed in eccentric relation to said front casing portion. Said casing portion 14 is provided with a neck 18 which carries a threaded nipple 20 for attaching the gauge to the tank (not shown). A flexible metal tape 22, for example a steel tape, or a tape of phosphor-bronze passes through an opening 23 in neck 18 and is attached at one end portion 24 thereof to a gauging device constituted by a float 25. As here shown, said float comprises sections 26 mounted on a rod 28, and the end portion of tape 22 is secured between the adjacent ends of said float sections 26 by a pin 30 which passes through an aperture 32 in the end of the tape and is embedded in said float sections. The latter snugly fit on rod 28 but may be moved thereon for removing or attaching the end portion 24 of the tape.

Tape 22 has coiled portions 34 and 36 disposed inwardly and outwardly, respectively, of the rim or flange 38 of a drum 40. For this purpose, rim 38 is provided with an opening 42 through which the tape passes for integrally connecting said outer and inner coiled portions 34 and 36 of the tape. An intermediate portion 44 of the innermost convolution of the outer coil tape portion 34 is fixed to rim 38 in the manner illustrated in Fig. 5, that is, by passing said intermediate tape portion 44 inwardly and outwardly of rim 38 through adjacent openings 46 through said rim. The end portion 48 of coil 36 is secured to a stud 50 fixed to a circular metal disk 52 eccentrically of the latter. For this purpose stud 50 is provided with a slot 54 within which the hooked end portion 48 of the tape is engaged.

Disk 52 is removably connected to a circular metal disk 56 in spaced relation thereto with drum 40 positioned therebetween for this purpose, disk 52 is provided with circumferentially spaced posts 58 which engage the confronting surface of disk 56 when said disks are assembled. Disk 56 is provided with correspondingly spaced apertures 60 through which fastening screws 62 project for engaging the internally threaded outer end portions of posts 58, for removably securing said disks together. A pin 64 is cast or otherwise formed on the inner surface of casing portion 14 and a notch 66 is formed in the periphery of disk 56 whereby to properly locate the assembly in the casing and to prevent rotation of said disk in relation to the casing, it being understood that the parts may be assembled and disassembled as said pin permits movement of said disk 56 axially of casing portion 14.

Provision is made for mounting drum 40 for rotation between disks 52 and 56. For this purpose disk portion 68 of the drum is provided with an outwardly projecting hub 70 fixed thereto centrally thereof. Said hub has a reduced end portion 72 providing a shoulder 74 between the ends of said hub. Said reduced hub portion 72 passes through an opening 76 in disk 56, while shoulder 74 of said hub engages the inner surface of said disk. Drum 40 is thus held against movement in one direction, i. e., toward disk 56. A pin 78 projecting from stud 50 extends into hub 70 of the drum and constitutes a bearing therefor, said drum being thus rotatable on said pin. Stud 50 is provided with an intermediate portion 80, adjacent pin 78 providing a shoulder 82 for holding drum 40 against movement toward disk 52. Thus, said drum is mounted for rotation and is held in spaced relation between disks 52 and 56. The outer end of gauge casing 14 is provided with a closure disk 84 secured in position in any suitable way and engaging the outer surface of disk 52.

Rotation of drum 40 is effected through the mechanism presently to be described for actuating indicator pointer 86. In accordance with the present invention, this is accomplished preferably by magnetic means. Therefore, provision is made for rotating a driving magnet 88 which controls a driven magnet 90 carried by indicator pointer 86. Magnet 88 is fixed to a gear 92 which is mounted for rotation on a bearing pin 94 fixed to and projecting from disk 56. Said magnet 88 is secured to gear 92 by screws 96, one at each of the two poles 98 of the magnet. Said poles 98 extend toward the poles of magnet 90 in a direction parallel to the axis of casing section 12. The shank of each screw 96 is received within a groove 100 provided in the poles 98. Gear 92 is engaged and rotated by a smaller gear 102 which is fixed at the free end of hub 70 whereby rotation of drum 40 is effective to rotate magnet 88. Gears 92 and 102 constitute reduction gearing whereby magnet 88 is rotated more slowly than drum 40. The above described eccentric relation of the casing sections permits the use of larger gear 92 while maintaining magnets 88 and 90 in concentric relation.

Pointer 86, which carries driven magnet 90 and is thereby rotated under the control of magnet 88, is mounted for rotation in cylindrical casing portion 12 over a suitably calibrated dial plate 104 removably secured in said casing portion in engagement with wall 16. A glass cover 106 is secured at the front end of the casing and is secured in position by a ring 108.

The manner in which the parts of magnetically actuated pointer 86 are assembled, and the manner in which said pointer is mounted for rotation will now be described. Referring in this connection first to Fig. 2 and Figs. 6 to 8 of the drawings, it will be observed that pointer 86 is provided with a central enlarged circular disk portion 110 having confronting arcuate flanges 112 forming a cupped part on said pointer. Said central part 110 of the pointer has fixed thereto a bearing pin 114 which is received and rotates in an opening 116 at the upper end of a bearing arm 118. The lower end of said bearing arm is secured to a projection 120 on the inner surface of casing portion 12. A bearing pin 122 is provided at the other side of pointer 86 and is rotatable in a circular recess 124 formed in casing wall 16. Said bearing pin 122 is carried by a flanged U-shaped bearing member and magnet-retaining plate 126. Magnet 90 is positioned between central portion 110 and between said flanged U-shaped bearing member 126, the parts being so related that the outer edges of flanges 128 of bearing member 126 are in frictional engagement with the inner surfaces of flanges 112 for releasably holding magnet 90 in place. Retaining and bearing member 126 is provided with diametrically opposed cut-out portions 130 through which poles 131 of magnet 90 project when the parts are assembled. Said poles 131 extend toward the poles of magnet 88 in a direction parallel to the axis of casing section 12. As shown in the drawings, the parts are designed so that flanges 128 contact with the inner surface of disk portion 110 of the pointer and so that the outer wall portion 132 of retaining and bearing member 126 engages the intermediate portion 134 of magnet 90 between the poles thereof. For more securely holding magnet 90 in position, prongs 133 are bent down from flanges 112 in position to overlie flanges 128 of member 126, thereby releasably clamping magnetic member 90 in position. To permit insertion and removal of magnet 90 and member 126, the sides 134' of the U-shaped member terminate at both ends thereof short of the periphery of flanges 128, said sides 134' being of about the same length as said magnet. The parts are assembled by inserting member 126 between flanges 112, with the prongs 133 positioned between the inner edges 136 of flanges 128, and then turning the parts so that said prongs are positioned over flanges 128. It will be observed that pointer 86 is rotatably adjustable in relation to magnetic member 90 and is rotatable therewith by reason of the frictional engagement between the cupped portion of the pointer and the flanges 128 of bearing and retaining member 126. This adjustable relation provides for setting the pointer properly in relation to the dial.

The operation of the gauge is believed to be apparent from the preceding description of its construction. It will be understood that the weight of the float, even when the latter is supported by the liquid within the container, exerts a force sufficient to unwind coiled portion 34 as the level of the liquid falls. It will be understood also that coil 36 constitutes a spring which releasably opposes unwinding of coil 34 and, conversely, serves to rewind said last mentioned coil when the float rises with the level of the liquid within the container. The winding and unwinding of coil 34 causes drum 40 to rotate, as said coil is fixed to the rim 38 of said drum by the engagement of portion 44 of the innermost convolution of coil 34 with the rim 38 of the drum. Rotation of drum 40 is communicated to driving magnet 88 through gears 102 and 92, as hereinbefore explained, whereby to actuate pointer 86 through the magnetic coupling of magnet 88 with pointer magnet 90.

When, in accordance with the preferred construction of the gauge, the indicator pointer is magnetically actuated, the gauge casing 10 and all of the parts associated therewith, with the exception of the magnets 88 and 90 are made of non-ferrous and non-magnetic metal. In the case of tape 22, however, it has been found that said tape may, as heretofore stated, be made of steel without adversely affecting the operation of the gauge.

Thus, it is seen that the gauge constructed as herein shown and described is well adapted to accomplish the several objects of the present invention. It will be understood, however, that certain changes in the construction and arrangement of parts may be made and will occur to those skilled in the art, particularly in view of the present disclosure. Therefore, I do not wish to be limited precisely to the embodiment of the invention disclosed herein, except as may be required by the scope of the appended claims.

Having thus described my invention, what I claim and desire to secure by Letters Patent is:

1. A gauge comprising a casing having a dividing wall and first and seconds sections on opposite sides of said wall, respectively, disposed in eccentric relation to each other, an indicator pointer mounted for rotation in said first section concentrically thereof, a member mounted for rotation in said second casing section concentrically thereof, means for rotating said member, a magnetic member mounted for rotation in said second section and rotated under the control of said first mentioned member eccentrically thereof, and a second magnetic member positioned in said first section of the gauge casing and operable under the control of said first mentioned magnetic member and rotatable concentrically therewith for rotating said pointer.

2. In a gauge of the class described, a casing, a drum mounted for rotation in said casing, a flexible tape having one end adapted to be connected to a gauging device and having its other end secured in fixed position in said casing, said tape being fixed to said drum and having a portion coiled thereon externally of said drum and a portion coiled within said drum, said coiled portions of the tape being arranged so that unwinding of said first mentioned coiled section rotates said drum in one direction and tensions said other coil of the tape, an indicator pointer, and means operated by said drum for actuating said pointer.

3. A gauge comprising a casing having a dividing wall and first and second sections on opposite sides of said wall, respectively, disposed in eccentric relation to each other, an indicator pointer mounted for rotation in said first section concentrically thereof, a drum mounted for rotation in said second casing section concentrically thereof, a flexible tape having one end adapted to be connected to a gauging device and having its other end secured in fixed position in said casing, said tape being fixed to said drum and having a portion coiled thereon externally of said drum and a portion coiled within said drum, said coiled portions of the tape being arranged so that unwinding of said first mentioned coiled section rotates said drum in one direction and tensions said other coil of the tape, a member mounted for rotation in said second section of the casing, means including reduction gearing operated by said drum for rotating said member, said gearing including a gear of one diameter arranged concentrically of one of said casing sections and a gear of larger diameter arranged concentrically of said other section of the casing, and means in said first section of the casing operable under the control of said member for rotating said pointer.

4. In a gauge, a casing, a pointer mounted for rotation in said casing, said pointer having an intermediate cupped portion, a magnetic member positioned within said cupped portion, a retaining member comprising an intermediate part engaging said magnetic member, and side portions engaging said cupped portion of said pointer for holding said magnetic member therein, and a second magnetic member mounted for rotation in said casing and operable to rotate said first mentioned magnetic member whereby to rotate said pointer.

5. In a gauge, a casing, a pointer mounted for rotation in said casing, said pointer having an intermediate cupped portion, a magnetic member positioned within said cupped portion, a retaining member comprising an intermediate part engaging said magnetic member, and side portions engaging said cupped portion of said pointer for holding said magnetic member therein, said magnetic member comprising pole portions disposed in parallel relation to the pointer axis, and a second magnetic member mounted for rotation in said casing and provided with pole portions having their ends confronting the pole portions of said first mentioned magnetic member.

6. In a gauge, a casing, a pointer mounted for rotation in said casing, said pointer having an intermediate cupped portion, a magnetic member positioned within said cupped portion, a retaining member comprising an intermediate part engaging said magnetic member, and said portions engaging said cupped portion of said pointer for holding said magnetic member therein, and a second magnetic member mounted for rotation in said casing and operable to rotate said first mentioned magnetic member whereby to rotate said pointer and pin bearings carried by said cupped portion and by said retaining member, respectively, at opposite sides of said pointer, and bearings in said casing in which said pin bearings are journalled for rotation.

7. In a gauge, a casing, a pointer mounted for rotation in said casing, said pointer having an intermediate enlarged portion provided with flanges extending parallel to the pointer axis of rotation, a magnetic member mounted on said intermediate pointer portion between said flanges, a member engaging said magnetic member and said flanges for retaining said member in position; and a second magnetic member mounted for rotation in said casing and operable to rotate said first mentioned magnetic member whereby to rotate said pointer and pin bearings carried by said cupped portion and by said retaining member, respectively, at opposite sides of said pointer, and bearings in said casing in which said pin bearings are journalled for rotation.

8. In a gauge, a casing, a drum mounted for rotation in said casing, said drum having a rim provided with an opening, a tape fixed to said drum for rotating the same, said tape having a portion thereof coiled externally of said rim and a portion coiled within said rim, said inner coiled portion being connected to said outer coiled portion by a part of the tape passing through said rim opening, and means in said casing to which the end of the inner coiled portion of the tape is fixed.

9. In a gauge, a casing, a pair of disks positioned in said casing in spaced relation axially thereof, one of said disks having a stud and a bearing pin, a drum mounted for rotation on said bearing pin between said disks, and about said stud, and a tape connected to said drum for rotating the same and having a coiled portion positioned within said drum and connected to said stud.

10. In a gauge, a casing, a pair of disks positioned in said casing in spaced relation axially thereof, one of said disks having a bearing pin and the other of said disks having an opening, a drum positioned between said disks and having a hub journalled on said bearing pin whereby said drum is mounted for rotation on said pin, means for rotating said hub, said hub projecting through said opening, a gear fixed to the projecting portion of said hub, a pointer mounted for rotation in said casing, and means actuated by said gear for rotating said pointer.

11. In a gauge, a casing, a pair of disks positioned in said casing in spaced relation axially thereof, one of said disks having a stud and a bearing pin, a drum mounted for rotation on said bearing pin between said disks, and about said stud, and a tape connected to said drum for rotating the same and having a coiled portion positioned within said drum and connected to said stud, said tape also having a portion coiled on said drum externally thereof, gearing rotated by said drum, a magnetic member rotated by said gearing, a pointer rotatably mounted in said casing, and a second magnetic member rotatable with said pointer and operable under the control of said first mentioned magnetic member for rotating said pointer.

12. In a gauge, a casing, a pointer mounted for rotation in said casing, a rotary bearing member for said pointer, said pointer being rotatable with said bearing member, a magnetic member rotatable with said bearing member, whereby said pointer is rotatable with said magnetic member, said pointer being rotatably adjustable in relation to said magnetic member, means for releasably clamping said magnetic member and said pointer in adjusted relation, and a second magnetic member mounted for rotation in said casing and operable to rotate said first mentioned magnetic member whereby to rotate said pointer.

DANIEL H. BIERMAN.